United States Patent
Fedorov

(10) Patent No.: US 11,583,875 B2
(45) Date of Patent: Feb. 21, 2023

(54) SYSTEMS AND METHODS OF ELECTRON BEAM INDUCED PROCESSING

(71) Applicant: Georgia Tech Research Corporation, Atlanta, GA (US)

(72) Inventor: Andrei G. Fedorov, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 3 days.

(21) Appl. No.: 17/223,620

(22) Filed: Apr. 6, 2021

(65) Prior Publication Data

US 2021/0245182 A1    Aug. 12, 2021

Related U.S. Application Data

(62) Division of application No. 15/577,130, filed as application No. PCT/US2016/034212 on May 26, 2016, now abandoned.

(60) Provisional application No. 62/167,596, filed on May 28, 2015.

(51) Int. Cl.
| | |
|---|---|
| *C23C 18/14* | (2006.01) |
| *B05B 5/16* | (2006.01) |
| *B82Y 10/00* | (2011.01) |
| *B05B 5/035* | (2006.01) |
| *B05D 1/04* | (2006.01) |
| *B05D 3/06* | (2006.01) |

(52) U.S. Cl.
CPC ............... *B05B 5/16* (2013.01); *B05B 5/035* (2013.01); *B05D 1/04* (2013.01); *B05D 3/068* (2013.01); *B82Y 10/00* (2013.01); *C23C 18/145* (2019.05)

(58) Field of Classification Search
None
See application file for complete search history.

(56) References Cited

U.S. PATENT DOCUMENTS

| | | | |
|---|---|---|---|
| 5,451,260 | A | 9/1995 | Versteeg et al. |
| 7,208,727 | B2 | 4/2007 | Fedorov et al. |
| 7,312,440 | B2 | 12/2007 | Degertekin et al. |
| 7,557,342 | B2 | 7/2009 | Fedorov et al. |
| 7,651,926 | B2 | 1/2010 | Jacobson et al. |
| 7,989,763 | B2 | 8/2011 | Fedorov et al. |
| 2003/0141450 | A1 | 7/2003 | Craven et al. |
| 2006/0057556 | A1 | 3/2006 | Janini et al. |
| 2007/0197044 | A1 | 8/2007 | Jacobson et al. |
| 2011/0290639 | A1* | 12/2011 | Gamero-Castano ........................ H01J 49/0004 204/298.36 |

(Continued)

OTHER PUBLICATIONS

M. Pauly et al., "A hydrodynamically optimized nano-electrospray ionization source and vacuum interface," Analyst, 2014,139, 1856-1867.

(Continued)

*Primary Examiner* — Joel G Horning
(74) *Attorney, Agent, or Firm* — Thomas | Horstemeyer, LLP

(57) ABSTRACT

Embodiments of the present disclosure provide for methods and systems for making structures using an electrospray system while under vacuum. In particular, embodiments of the present disclosure provide for methods and systems for ultra-fast growth of high aspect ratio nano/meso/micro-structures with three dimensional topological complexity and control of phase and composition of the structure formed.

20 Claims, 10 Drawing Sheets

(56) References Cited

U.S. PATENT DOCUMENTS

2015/0075998 A1   3/2015  Cooks et al.

OTHER PUBLICATIONS

C.T. Pan et al., "Ultrasonic sensing device with ZnO piezoelectric nanorods by selectively electrospraying method ," Sep. 2014 Sensors and Actuators A Physical 216:318-327.

Donev, E. U.; Hastings, J. T., "Liquid-precursor electron-beam-induced deposition of Pt nanostructures: dose, proximity, resolution", Nanotechnology 2009, 20 (50), 1-7.

Schardein, G.; Donev, E. U.; Hastings, J. T., "Electron-beam-induced deposition of gold from aqueous solutions", Nanotechnology 2011, 22, (1), 1-6.

Sutter, E. A.; Sutter, P. W., "Determination of Redox Reaction Rates and Orders by In Situ Liquid Cell Electron Microscopy of Pd and Au Solution Growth", Journal of the American chemical society 2014, 136 (48), 16865-16870.

Ocola, L. E.; Joshi-Imre, A.; Kessel, C.; Chen, B.; Park, J.; Gosztola, D.; Divan, R., "Growth characterization of electron-beam-induced silver deposition from liquid precursor", J. Vac. Sci. Technol. B 2012, 30 (6), 1-7.

Grogan, J. M.; Schneider, N. M.; Ross, F. M.; Bau, H. H., "Bubble and Pattern Formation in Liquid Induced by an Electron Beam", Nano Lett. 2014, 14 (1), 359-364.

Liu, Y.; Chen, X.; Noh, K. W.; Dillon, S. J., "Electron beam induced deposition of silicon nanostructures from a liquid phase precursor", Nanotechnology 2012, 23 (38), 1-6.

Donev, E. U.; Schardein, G.; Wright, J. C.; Hastings, J. T., "Substrate effects on the electron-beam-induced deposition of platinum from a liquid precursor", Nanoscale 2011, 3 (7), 2709-2717.

Bresin, M.; Chamberlain, A.; Donev, E. U.; Samantaray, C. B.; Schardien, G. S.; Hastings, J. T., "Electron-Beam-Induced Deposition of Bimetallic Nanostructures from Bulk Liquids", Angewandte Chem. 2013, 125, 8162-8165.

Randolph, S. J.; Botman, A.; Toth, M., "Capsule-free fluid delivery and beam-induced electrodeposition in a scanning electron microscope", RSC Advances 2013, 3 (43), 20016-20023.

Bresin, M.; Botman, A.; Randolph, S. J.; Straw, M.; Hastings, J.T., "Liquid Phase Electron-Beam-Induced Deposition on Bulk Substrales Using Environmental Scanning Electron Microscopy", Microsc. Microanal. 2014, 20, 376-384.

Fisher, J. S.; Kottke, P. A.; Kim, S.; Fedorov, A. G., "Rapid Electron Beam Writing of Topologically Complex 3D Nanostructures Using Liquid Phase Precursor", Nano Lett. 2015, 15, 8385-8391.

* cited by examiner

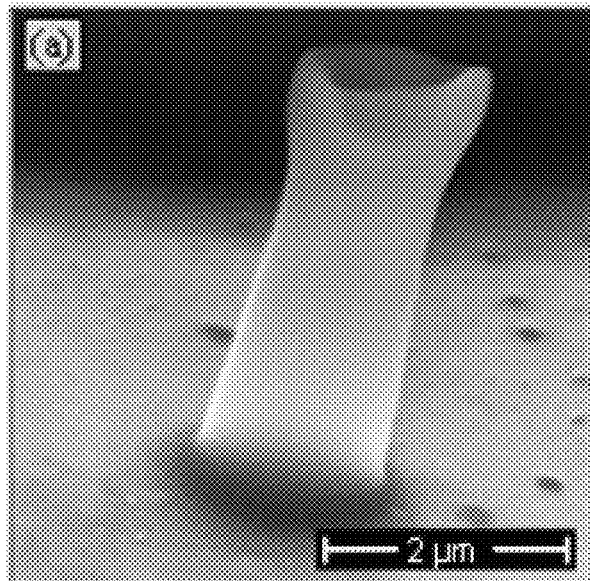
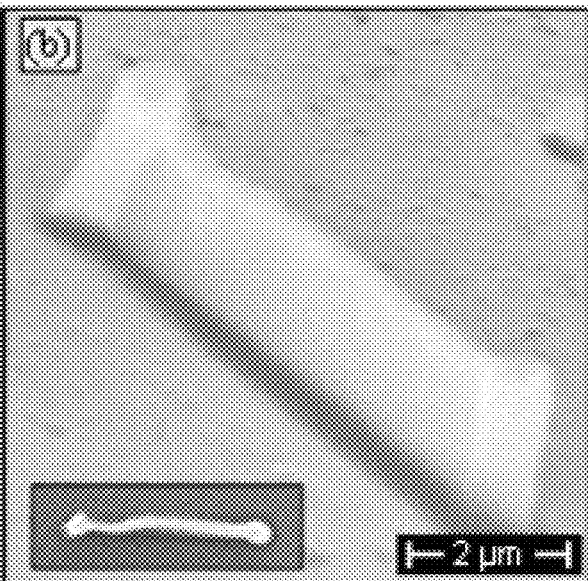
Fig. 2A	Fig. 2B
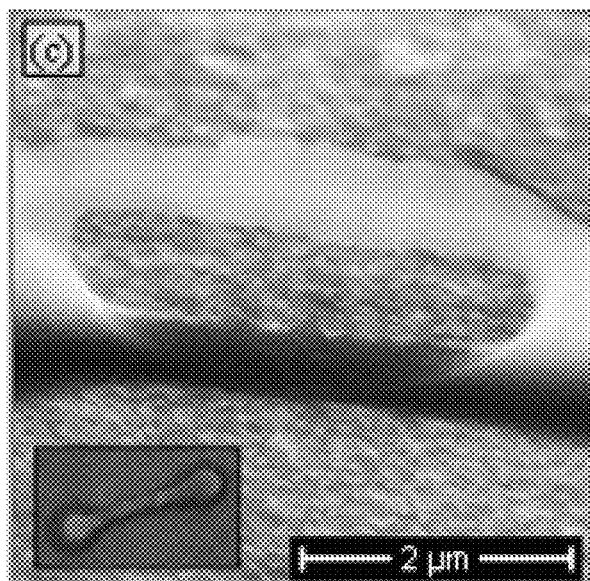
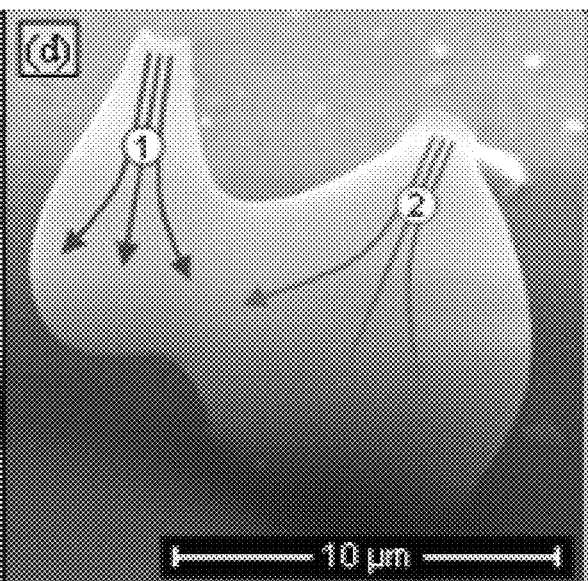
Fig. 2C	Fig. 2D

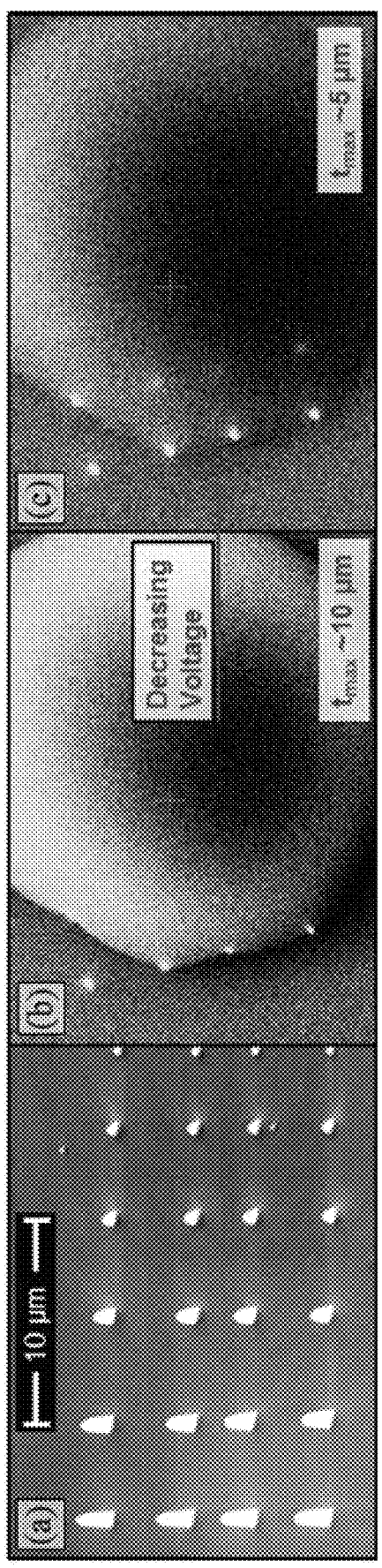
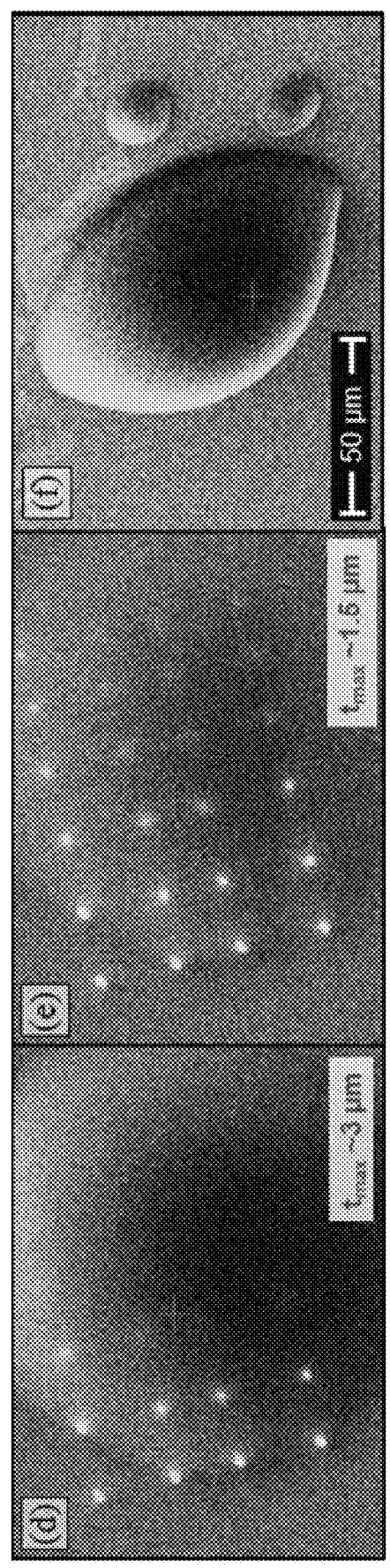
Fig. 4A Fig. 4B Fig. 4C
Fig. 4D Fig. 4E Fig. 4F

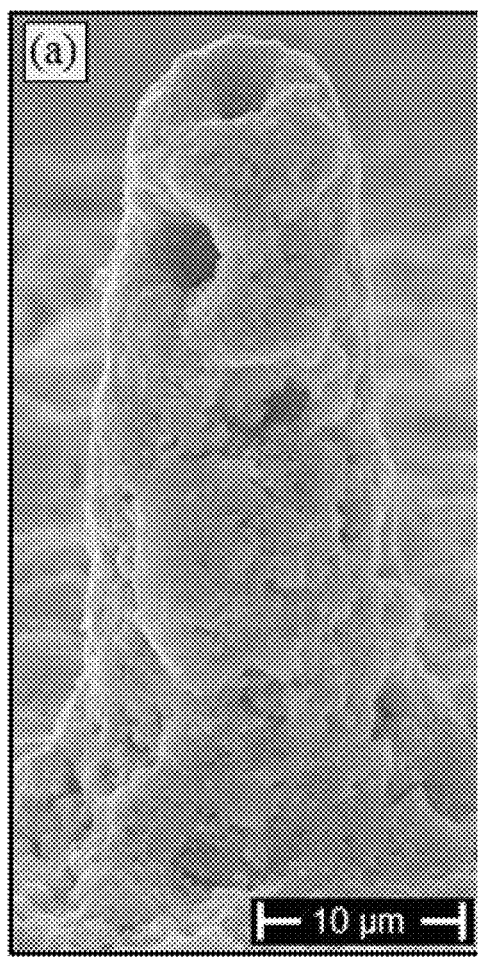
Fig. 5A
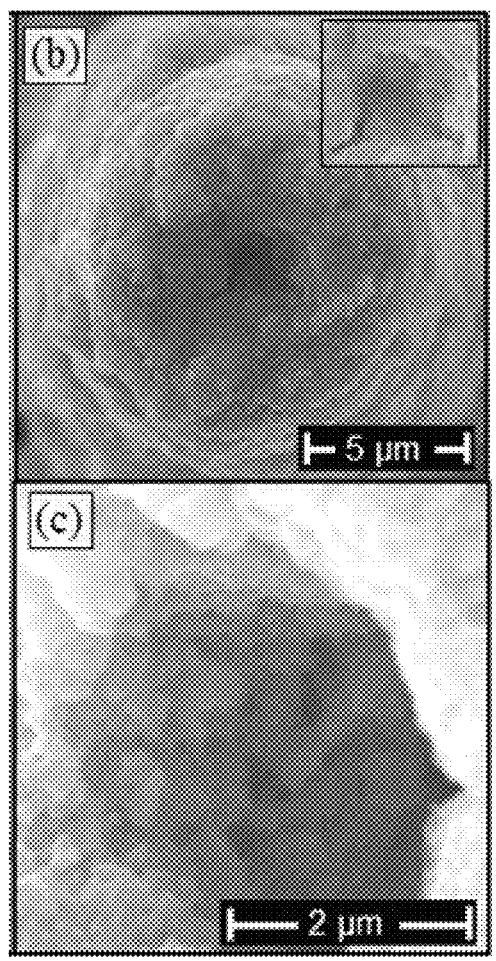
Fig. 5B
Fig. 5C
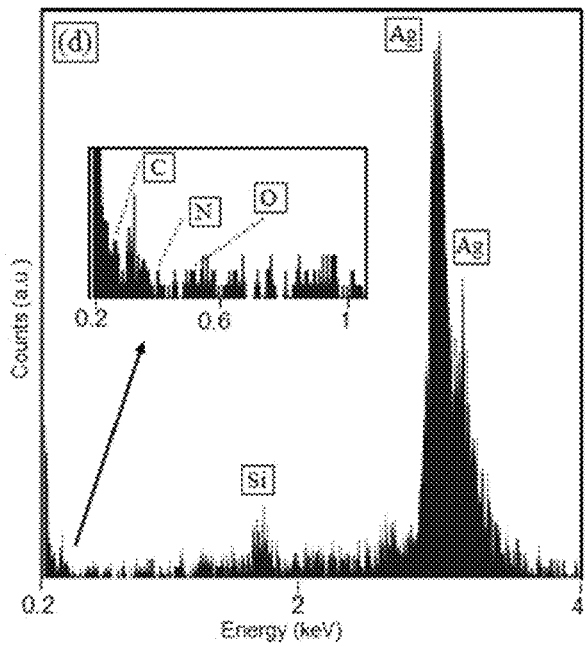
Fig. 5D

SYSTEMS AND METHODS OF ELECTRON BEAM INDUCED PROCESSING

CROSS-REFERENCE TO RELATED APPLICATION

This application is a divisional of and claims priority to U.S. patent application entitled "SYSTEMS AND METHODS OF ELECTRON BEAM INDUCED PROCESSING", filed Nov. 27, 2017, and assigned application Ser. No. 15/577,130, which claims priority to 35 U.S.C. § 371 national stage of PCT application having serial number PCT/US2016034212, filed on May 26, 2016 which claims priority to U.S. provisional application entitled "ELECTRO SPRAY ASSISTED ELECTRON BEAM INDUCED DEPOSITION OF NANOSTRUCTURES FROM LIQUID PHASE PRECURSORS," having Ser. No. 62/167,596 filed on May 28, 2015, which are entirely incorporated herein by reference.

FEDERAL SPONSORSHIP

This invention was made with Government support under Contract/Grant No. DE-SC0010729, awarded by US Department of Energy, Basic Energy Sciences. The Government has certain rights in this invention.

BACKGROUND

Focused Electron Beam Induced Deposition (FEBID), also referred to as Focused Electron Beam Chemical Vapor Deposition (FEB-CVD), is an emerging additive manufacturing method for "direct writing" of three-dimensional nanostructures from a variety of materials. It was discovered accidentally in 1934 by Steward as an undesirable phenomenon in high resolution scanning electron microscopy (SEM). As a sample is scanned in an SEM chamber, the electron beam dissociates contaminant molecules on the surface to produce reaction products that chemisorb to and form a deposit on the surface. Therefore, looking at any feature in the SEM alters the feature and introduces artifacts due to carbon deposition during sample imaging. This process is undesirable to imaging, and is typically prevented through abrasive chemical treatment of samples prior to imaging; however, such treatment may damage the sample. On the other hand, carbon deposition can also be made useful and applied to direct writing of nanostructures. FEBID has been increasingly used as a nanomanufacturing tool for many applications, ranging from IC mask repair, to electrical interconnect fabrication, and to rapid prototyping of topologically complex opto-electro-mechanical devices.

FEBIP serves as a powerful tool for both additive (FEBID) and subtractive (FEBIE) processing by enabling atom-by-atom and molecule-by-molecule material placement and removal through use of an electron beam. Fundamentally FEBIP methods use delivery of the electron of an appropriate energy as a reactant to the reaction site. There, electrons can participates in chemical structure altering collisions, participate directly in reactions by breaking bonds with the appropriate energy, or act as a more traditional" chemical reagent, participating in (electro)chemical reactions with cations.

FEBID is an additive direct-write means to create 3D nanostructures, bringing the functionality, utility, and flexibility of 3D printing to the nanoscale. FEBID differs from the most common nanoscale direct-write methods in that particles are not mechanically placed or otherwise forced into a location, but the material is grown atom-by-atom or via reaction of an irradiating electron beam with precursor material. For example, dip-pen nanolithography is a method of evenly placing linear organic molecules on a substrate by coating an AFM tip with precursor molecules which diffuse through a liquid bridge between the tip and a substrate to form a chemical bond with the substrate. Nanofiber spinning is essentially a scaled down version of macroscale consumer-grade 3D printing methods, in which a polymer is extruded and stacked to form 3D structures. Therefore it relies on mechanically directed growth via motion of the injection nozzle. FEBID is fundamentally different because growth is mediated through combined effects of precursor concentration and state, and electron irradiation. Electrons reach the deposition site through direct impact and propagation through the precursor, as well as by scattering through an adjacent domain and emerging into the precursor-containing domain. FEBID can therefore be used to create suspended structures as was demonstrated in our work with liquids and using cryogenically condensed organometallics and spin-coated polymers.

Focused Ion Beam Induced Deposition (FIBID) is a similar process to FEBID, and is sometimes preferred over FEBID due to its higher deposition rate in the beam-limited growth regime and improved "as-deposited" deposit purity with respect to co-deposited carbon contaminants. It has, however, the disadvantages of surface damage, ion implantation, and a generally lower resolution. Since both FEBID and FIBID utilize low energy secondary electrons (SE) generated upon interaction of high energy primary electrons (FEBID) or ions (FIBID) with precursor molecules to produce a deposit, there is a significant degree of overlap in the fundamental principles and models describing both deposition processes. Therefore, while the proposed research is focused on FEBID, its implications are much broader and will impact the advances in FIBID, as well.

Subtractive nanofabrication involves directed removal of atoms and molecules from a larger bulk, where the material that remains after processing is the desired structure. For the "direct write" format, simple etching can be performed with thermomechanical AFM tips which impact and penetrate the substrate, leaving behind an indentation. However, the resolution of this method is limited by the size of the probe and control over tip actuation, as well as its suffering from diminishing tip sharpness in the course processing with negative implications to patterning quality especially when applied over large areas. Lithography through FEBIE allows for nanometer-scale precise material etching with high aspect ratios (e.g., poration greater than 1:10 ratio for diameter to depth, as demonstrated in Si). As with FEBID, FEBIE is a very powerful "direct write" technique for material editing, as it does not require mechanical contact or actuation to expose the growth/etch site to the reagents, and it has been successfully demonstrated in many applications.

Despite this progress, new methods for making structures are desired.

SUMMARY

Embodiments of the present disclosure provide for methods and systems for making structures using an electrospray system while under vacuum (e.g., a pressure of $10^{-6}$ to 30 Torr).

One exemplary system, among others, includes: an electron beam system for generating an electron beam, a substrate, wherein the electron beam system is configured to direct the electron beam to a first area on the substrate, an electrospray system for directing a liquid onto the substrate to form a liquid film on the substrate, and a compartment housing the substrate, wherein the compartment is under a vacuum, wherein the electrospray system is configured to deliver the liquid in the compartment house under vacuum, wherein the electron beam is transmitted in the compartment under vacuum.

One exemplary method, among others, includes: forming a liquid film by electrospray using an electrospray system on a substrate in a vacuum; directing an electron beam into a first area of the liquid film, wherein the electron beam is transmitted to the liquid film in the vacuum; and one or both of: forming a first structure, wherein the liquid film includes a first liquid, wherein the first structure is formed in the first area from the interaction of the electron beam with the first liquid, and forming a second structure, wherein the liquid film includes a second liquid, wherein the second structure is formed by etching with the second liquid and the electron beam, wherein the when second liquid contains an acid.

Other systems, methods, features, and advantages of this disclosure will be or become apparent to one with skill in the art upon examination of the following drawings and detailed description. It is intended that all such additional systems, methods, features, and advantages be included within this description, be within the scope of this disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIGS. 2A-D are images of NESA-FEBID fabricated amorphous carbon nanostructures formed from liquid-phase precursor. FIG. 2A is an example of 5 μm vertical nanopillar of nearly uniform diameter with smooth surface and well-defined features, grown rapidly (in 10 seconds) on $SiO_2/Si$ substrate. FIG. 2B is wall-like nanostructure connecting two pillars formed in 6 s at beam energy 30 keV and current 500 pA with 2 s growth times each for pillars and the bridge. FIG. 2C shows a bridge-like arch nanostructure connecting two substrate nanoposts, formed by exploiting the flexibility of 3D directionality in material growth—inset shows bridge from top-down view. FIG. 2D shows two closely-spaced deposits grown downward sequentially at 30 keV and 1 nA with 30 s and 40 s growth times, i.e., both nucleating at the free liquid surface and proceeding vertically down, until one deposit (#2) attaches to the substrates, while the other (#1) stops before reaching the substrate and remains suspended over the substrate by fusing to the neighboring (substrate-attached) pillar due to lateral widening during growth.

FIG. 3A is a Raman spectrograph after background subtraction shows broad, significantly overlapping D and G peaks, which implies that the deposit structure is primarily amorphous carbon. D and G peak locations are assigned by spectral deconvolution of the Raman data. FIG. 3B is a Raman spectrograph showing clearly defined D and G peaks at 1377±3.0 $cm^{-1}$ and 1599±1.0 $cm^{-1}$ spectral positions, respectively, with a D/G peak area ratio of 2.1±0.1, which indicates a significant increase in graphitic carbon content as a result of laser annealing.

FIGS. 4A-F are a sequence of images depicting the liquid film evolution and ability to achieve thin films from nano-electrospray of ethylene glycol and acetic acid. FIG. 4A is an array of Pt nanopillars, with heights from 260 to 2400 nm right to left, which are e-beam grown on the substrate for use as a 2D "nanoscale ruler" for characterizing the lateral thinning of the liquid film upon formation by nanoelectrospray injection and stabilization on the substrate via evaporation. FIGS. 4B-E are a clockwise snapshot sequence of thinning the nanoelectrospray-generated film on top of the nanopillar "ruler" array, giving an approximate maximum film thickness ($t_{max}$) obtained in-situ under conditions relevant to NESA-FEBID experiments. Proceeding from frame 4B to 4E, the liquid film thickness is reduced as electrospray voltage is reduced, which is used for achieving optimal conditions for stable application of NESA-FEBID. FIG. 4F is an image of an initially injected liquid pool as viewed from 45° to surface normal with satellite droplets formed from electrospray.

FIGS. 5A-D characterize high-purity silver micropillar deposited using electrospray of silver nitrate metal salt dissolved in ethylene glycol solvent. FIG. 5A is an SEM micrograph of ~40 μm tall micropillar deposited at beam energy of 25 keV and current of 13 nA for 300 s beam exposure. Material shown is water-insoluble as determined from soak testing. FIG. 5B is a concave structure at top of pillar is closed as seen from top-down. FIG. 5C shows magnification of hole on side of micropillar reveals a rough, granular structure. FIG. 5D is the EDS (EDX) spectrum of silver micropillar. Peaks at 3.0 and 3.1-3.3 keV indicate presence of silver in deposit. It is assumed that all precursor metal salts have been removed due to lack of oxygen peak expected at 0.5 keV. The Si contained in the $Si/SiO_2$ substrate accounts for the peak at 1.7-1.8 keV.

FIGS. 7A-B show bubbling of the liquid at the deposition occurs at some imaging conditions and is avoided by reduction of beam energy and current. FIG. 7A shows bubble formation is faster than the top-to-bottom scan rate and image capture rate, leading to imaging artefacts that show bubbles vanishing and forming. FIG. 7B shows that bubbles form nearby and under bridge deposits, leading to destruction of deposits. FIGS. 7C-E are nanopillars grown at elevated exposure times and beam currents, resulting in growth of irregular material on top of deposit. Electron beam conditions: (FIG. 7C) 25 keV, 25 s, 500 pA; (FIG. 7D) 30 keV, 30 s, 1 nA; (FIG. 7E) 30 keV, 30 s, 1 nA.

In FIG. 9A, EDX indicates 4:1 carbon to oxygen composition in as-deposited nanostructure when stoichiometrically corrected for oxygen in $SiO_2$ layer of the substrate underneath deposit. This corresponds to amorphous carbon with significant content of entrapped OH ligands. In FIG. 9B, EDX spectrum of laser-annealed nanostructure reveals reduction in both C and O content relative to Si signal; when stoichiometrically corrected for oxygen in $SiO_2$ layer, the actual carbon to oxygen ratio substantially increases upon annealing to 12:1.

DETAILED DESCRIPTION

Figure 1:
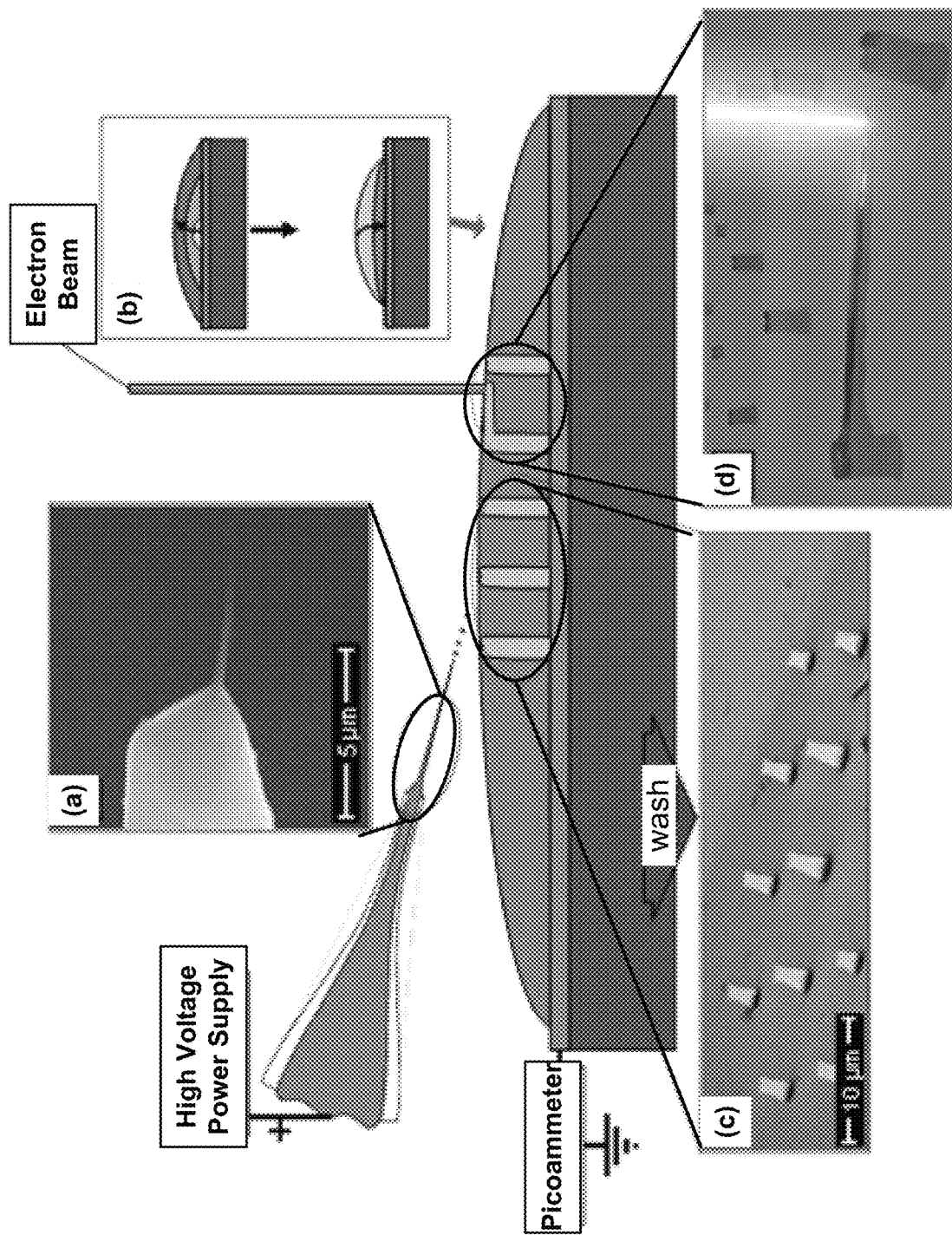
FIG. 1 is a schematic of deposition process, called NESA-FEBID (or NanoElectroSpray-Assisted FEBID) with key processes highlighted in callouts. In step (a), liquid precursor is introduced via nano-electrospray from a pulled glass capillary tip as visualized in situ by SEM. Driven by electrical stresses due to applied potential, the liquid electrolyte is drawn out in the form of Taylor cone from which a jet with diameter on the order of hundreds of nanometers is emitted. In step (b), as the applied electrospray bias is increased, the liquid injection rate also increases and the film spreads and thickens. Once the desired film coverage of the substrate is achieved, the electrospray voltage is decreased, reducing the injection flow rate and causing the film thickness to decrease with little or no change of the film lateral extent. By adjusting the applied voltage, the film thickness can be dynamically adjusted. The e-beam induces deposition when it interacts with the liquid precursor, growing into the film bulk starting at the liquid/vacuum interface. Upon reaching a substrate the growing deposit contacts and strongly adheres to the solid surface. In step (c), an array of pillar deposits is formed (here is an example of amorphous carbon pillars deposited at about 1-2 μm/s growth rate with a primary electron beam dose of 1 nC over 2 seconds at 25 keV energy using ethelyne glycol as an electrosprayed liquid precursor). In step (d), if the beam is moved rapidly over the film surface, then the deposit does not penetrate to reach the substrate. This is used to make structures such as a suspended bridge connecting two nanopillars as illustrated in step (d) and shown in FIGS. 2A-D.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of analytical chemistry, microscopy, imaging, biotechnology, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in bar. Standard temperature and pressure are defined as 0° C. and 1 bar.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion:

Embodiments of the present disclosure provide for methods and systems for making structures using an electrospray system while under vacuum. In particular, embodiments of the present disclosure provide for methods and systems for ultra-fast growth of high aspect ratio nano/meso/microstructures with three dimensional topological complexity and control of phase and composition of the structure formed. The structure can be formed using a liquid film formed and electron beam in a vacuum, where the compounds of the liquid are used to form the structure (e.g., deposition). Alternatively, the liquid film (e.g., containing an acid) can be used with the electron beam to etch the substrate or part of the deposit to form a structure (e.g., etching). The liquid film can be formed using an electrospray system that disposes the liquid onto a substrate while under vacuum. In an embodiment, the structure can be formed by deposition or etching, and a formed structure can be further altered by deposition or etching after being formed.

Embodiments of the present disclosure are advantageous for at least the reason that: (1) increasing the growth rate of deposition/etching of the structures, (2) enabling deposition of composite materials and alloys with tailored electromechanical properties, and (3) fabrication of new, truly three dimensional topologies of structures that cannot be fabricated using similar techniques.

Embodiments of the present disclosure provide for growth rates of structures that can be 3-5 orders of magnitude faster than rates reported from other similar techniques and formation of unique three dimensional topologies, such as nanoscale bridges, bridge-like "arch" structures, fusing two or more deposits, scaffolds, and simultaneously vertical and side-growing/merging nanostructures, using precisely controlled formation of a liquid film and an electron beam.

Embodiments of the present disclosure provide for Focused Electron Beam Induced Deposition (FEBID) using liquid phase precursors delivered using an electrospray (e.g., nanoelectrospray) jetting process into the vacuum environment of a deposition chamber. Embodiments of the present disclosure use an "energetic jet" assisted FEBIP to control local delivery of energized/activated precursors to the substrate by extending the available precursor state from gas to liquid phase.

Producing thin liquid films using an electrospray system inside of the vacuum environment of a low pressure chamber (SEM chamber) enables the formation of high-resolution, topologically-complex three dimensional structures from a liquid-phase precursor. In general, the liquid precursor is directly delivered from the electrospray tip onto the substrate, and the width of the liquid film and its thickness (e.g., sub micrometer) can be controlled with adjustment of electrospray electric field. Electrospray serves the purpose of controllable liquid injection to the deposition site— variations in applied potential near the spray onset and adjustments in spray tip positioning are used to make small adjustments in the flow rate.

Embodiments of the present disclosure allow purely aqueous and organic solvents as well as mixtures to be delivered by electrospray jets. This approach demonstrates the capabilities for electron-beam deposition of different materials, ranging from pure metals to carbon based on the type of fluid precursor.

An embodiment of the present disclosure provides for a system of forming (e.g., deposition and/or etching) structures. An embodiment of the system includes an electron beam system, a substrate, and an electrospray system, where forming the structure is performed under vacuum. In addition, the system can include a computer(s) system that can be in communication with one or more components of the system and/or in communication with computers that operate one or more of the components of the system. In an embodiment, the computer system can be used to acquire and/or manage various data such formation of the Taylor cone, liquid on the substrate, temperature of the substrate, pressure in the deposition chamber, electron beam current, electric potential used for producing electrospray, and the like.

In an embodiment, the electron beam system generates one or more electron beams that each be controllably directed at a specific area or the same area. In an embodiment the electron beam is in a vacuum, so that the electron beam is not attenuated or scattered and can be more precisely controlled. In an embodiment, the electron beam system can include an electron scanning microscopy device, where the electron scanning microscopy device are well known and can include devices such as FEI Quanta 200 SEM, Hitachi TM30303 SEM, Zeiss EVO LS 25 variable pressure SEM. In an embodiment, the electron beam can have an energy of about 0.3 to 40 keV with a current of about 1 pA to 1 µA.

In an embodiment, the substrate is positioned relative to the electron beam so that the electron beam can be directed onto one or more areas of the substrate. In addition, the substrate is positioned relative to the electrospray system so that the liquid from the electrospray system can be directed onto the surface of the substrate to form the liquid film. In an embodiment, the substrate can be positioned on a stage position and control system that can include a stage that can be used to move the substrate relative to the electron beam and/or the electrospray system so that the position at which the structure is formed is known and the position can be adjusted to form structures at various locations on the substrate. The stage can be used to move a stage in the x-, y-, and/or z-directions relative to the electron beam and/or the electrospray system. In an embodiment, the stage and the electron beam and/or the electrospray system can be moved in the x-, y-, and/or z-directions relative to one another. In an embodiment, the stage can include a cooling/heating system to control the temperature of the substrate, which can be used to control the film thickness (by controlling rate of evaporation) as well as the rate of different reactions promoted by electron beam irradiation thus achieving selectivity towards desired deposition/etching chemistry pathway. In an embodiment, cooling/heating system can include a thermoelectric device independently or integrated into a stage, Peltier cooler/heater, a liquid cooled/heated stage, a phase-change thermal energy storage material (PCM), resistance heaters, and the like. In an embodiment, the substrate can include gold, palladium, gold-palladium, silver, aluminum, graphene, or ITO (Indium Tin Oxide), polymers, $Si/SiO_2$, combinations thereof, and the like. As mentioned above, the substrate material can be used to form the structure.

An electrospray system can be used to direct a liquid onto the substrate to form the liquid film on the substrate. In an embodiment, the electrospray system can include one or more electrospray capillary tips. In an embodiment, the electrospray capillary tip can have an orifice diameter of about 1 µm to 5 µm or 10 µm to 100 µm and capillary length can be about 1 mm to 10 mm or about 1 cm to 10 cm. The capillary tip can positioned (e.g., about 100 µm to 1 mm or 1 mm to 10 mm away from the substrate) relative to the substrate so that a liquid film can be formed on the substrate. In an embodiment, the capillary can be prefilled with a liquid or the capillary can include a system to flow fluid to the capillary to be ejected. The electric field of the electrospray system can be selected so that the liquid film forms on the substrate. The electric field can be generated by applying a bias potential (e.g., a positive or negative bias potential) to the capillary, and the substrate is held at or near ground.

Thin liquid pool(s) can be achieved by initiating spray and adjusting the potential and the tip/substrate gap until a droplet of desired width is observed. Then, the potential can be slowly reduced until the droplet is reduced to a pool (liquid film). It has been observed that under typical operating conditions the contact line between the droplet and the substrate will remain pinned, allowing the width of the liquid film to be sustained which allows the thickness of the liquid film to be controlled. In an embodiment, the liquid film can a thickness of about 10 nm to 1 µm and has a width is about 10 µm to 10 mm.

As mentioned above, the electrospray system can include two or more electrospray capillary tips, where each electrospray capillary tip can independently direct a liquid onto the substrate. The liquid emitted from each electrospray capillary tip can be the same or different. As will be discussed below, multiple electrospray capillary tips can be used in conjunction with multiple electron beams.

In an embodiment, the electric field to induce electrospray applied relative to the ground electrode of the electrospray system can be about 500 V/mm to 1500 V/mm. In an embodiment, the electric field of the electrospray system can be adjusted using one or more of the following: the properties of the sprayed liquid, tip geometry, orientation relative to the substrate, combinations thereof and the like. In an embodiment, a bias between the electrospray capillary tip and the substrate is about 200 to 600 V and a spray current of about 10 pA to 100 nA.

In an embodiment, the electrospray system has a liquid delivery rate of about 1 nL/s to 100 nL/s. Once the liquid film is formed, the volume of the liquid in the liquid film can be maintained adjusting the liquid delivery rate considering the pressure, temperature, and the thermodynamic properties of the liquid to form the structure.

In an embodiment, the capillary tips can be pulled glass capillaries (sampling orifice dimensions from 200 nm to 2 µm) and the internal surface can be made non-wetting via silanization to prevent flooding, and electrospray voltage applied to the liquid/vapor interface via an internal wire counter-electrode.

One embodiment of the electrospray system includes a capillary with an integrated counter electrode to generate electrospray. Fused silica sampling capillaries have been used and can have about a 10 µm inner diameter to 50 µm inner diameter and can be about 8 mm to 3 cm in length. All of the capillaries have a tapered outer diameter at the spray end. Capillaries can be purchased (New Objective Silica Tips), while others are originally fabricated in-house using meniscus etching. Further details are available in reference (Kottke, P. A., Degertekin, F. L., and Fedorov, A., The Scanning Mass Spectrometry Probe: a scanning probe electrospray ion source for imaging mass spectrometry of submerged interfaces and transient events in solution, *Anal. Chem.*, 82 (1), 19-22 (2010), which is included herein by reference)

In an embodiment, the electrospray system includes appropriately interfaced (e.g., electrically isolated) components so that different electric potentials can be applied to produce an appropriate electric field for driving the fluid via electromotive force. Upon application of an appropriate electric potential (voltage) to the capillary tip, a Taylor cone of the fluid is electrohydrodynamically-induced and extends out through the orifice of the tip. The Taylor cone of the solution is sprayed out of a capillary tube filled with the fluid to form a cone and disperse fluid into droplets that are directed to the substrate, where a droplet of fluid is formed. The formation of the Taylor cone is dependent, at least, upon the fluid, the diameters of the orifice, one or more of the applied electric potentials (electrode voltages), the electrode locations, the strength and orientation of the electric field, and the like.

In a particular embodiment a prefilled pulled glass capillary can be mounted in the vacuum chamber (e.g., SEM chamber) and the capillary tip is brought near (e.g., about 500 µm to 5 mm) to the substrate. A high-voltage power supply can be used to apply a positive bias (e.g., about 500 V to 2500 V) to the capillary, and the substrate is held at or near ground, depending on whether or not current is being measured using a picoammeter to allow for high-precision nanoelectrospray current measurement. The onset of electrospray can be determined by observing through the SEM detector the formation of the electrohydrodynamic Taylor cone and the accumulation of liquid on the substrate, and changes in the measured current by picoammeter. In an embodiment, the electron beam can be blanked during electrospray to allow for only the contribution of current due to spray to be measured. Thin liquid pools can be achieved by initiating spray and adjusting the potential and the tip/substrate gap until a droplet of desired width is observed. Then, the potential can be slowly reduced (e.g., the rate of reduction depends, at least upon the application, liquid, pressure, temperature and the like) until the pool is reduced to a liquid film.

As mentioned above, the structure is formed in a vacuum. A compartment (e.g., SEM system) housing the substrate can be held at vacuum (e.g., a pressure of $10^{-6}$ to 30 Torr), wherein the electrospray system is configured to deliver the liquid in the compartment house under vacuum, wherein the electron beam is transmitted in the compartment under vacuum (e.g., electron beams have less scattering at low pressures and can be more precisely controlled). In addition, the capillary tip is disposed within the vacuum to form the liquid film on the substrate. The vacuum in the compartment can be maintained using one or more vacuum pumps as are known in the art to achieve the desired pressure.

Figure 11:
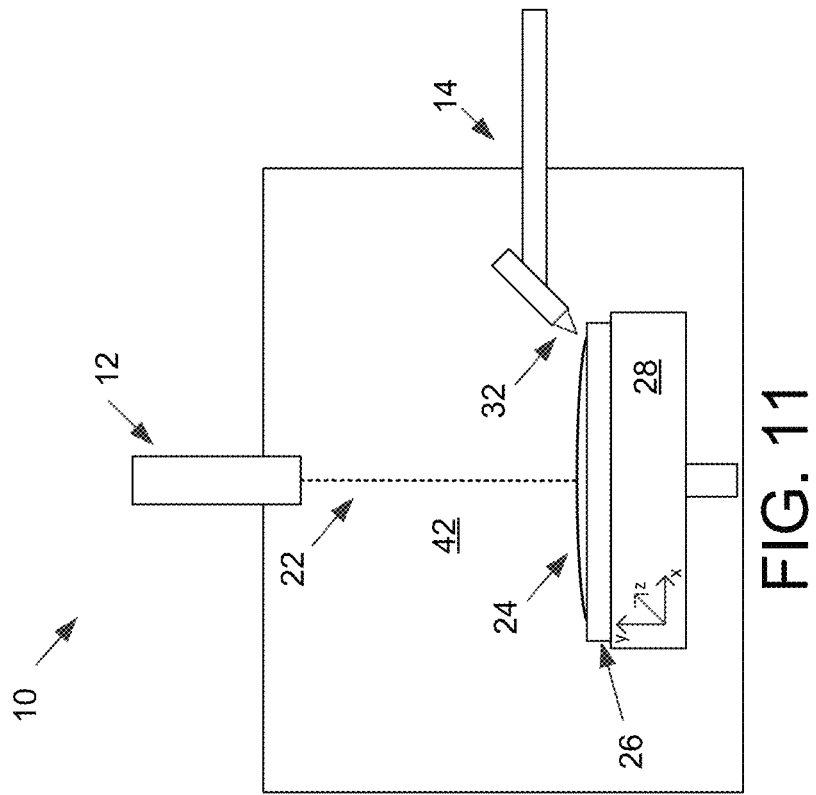
FIG. 11 illustrates a schematic of the system for forming structures.
Figure 10:
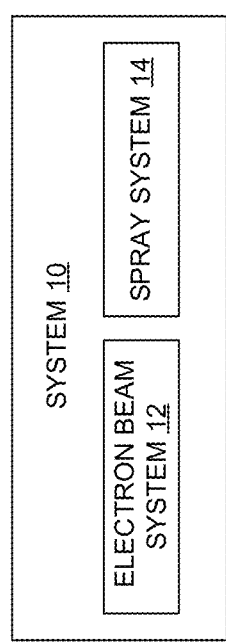
FIG. 10 illustrates a schematic of the system for forming structures.

Now having described the system in general, the following provides additional details regarding the system and components of the system. FIGS. 10 and 11 are schematics of an embodiment of a system 10. In an embodiment, the system 10 includes an electron beam system 12 that emits an electron beam 22 at a liquid film 24 on a substrate 28, where the electrons interact with the liquid film 24 and/or the substrate to produce (e.g., deposit or etch) a structure (not shown). The substrate 26 can be positioned on a stage 28 that can be adjusted to form structure at different locations on the substrate 26. The electron beam 22, the liquid film 24, substrate 26, and the electrospray capillary tip 32 are within the vacuum of the compartment 42.

In an embodiment, the method of forming a structure include forming a liquid film by electrospray using an electrospray system on a substrate in a vacuum (e.g., a pressure of 10' to 30 Torr). Once the fluid pool is formed from a collection of electrosprayed droplets, the fluid pool can be converted into a liquid film in a manner as described herein. One or more electron beams (e.g., an energy of about 0.3 to 40 keV with a current of about 1 pA to 1 µA) can be directed to one or more areas on the liquid film. The electron beam can be directed to an area for a variable amount of time (e.g., about 1 second to 1 min) depending upon the deposition or etching to be performed, the area coverage, properties of the liquid, electrospray flow rate, pressure and temperature in the chamber, etc. In an embodiment, the deposition or etch rate can be about 0.1 $\mu m^3/s$ to about 10 $\mu m^3/s$.

In an embodiment, the forming of the liquid film can be controlled by one or more of the following: controlling the spreading of the liquid (e.g., use of an additive such as Sodium Dodecyl Sulfate (SDS), or other surfactants), controlling the evaporation of the liquid, controlling the rate of liquid delivery, and a combination thereof. In particular, the liquid film formation can be controlled by one or more of: adjusting an electrospray bias of the electrospray capillary tip used to form the liquid film, adjusting a distance between the electrospray capillary tip from the liquid film, or a combination thereof.

In an embodiment, the electron beam can be used to form a first structure (where the liquid film is a first liquid). The first structure is formed in the first area from the interaction of the electron beam with the first liquid. In an embodiment, the formation of the first structure can include keeping the electron beam stationary for a period of time to form the desired first structure (e.g., a pillar) or the electron beam can be moved at a desired rate to from a first structure having a more complex shape such as a bridge structure, an overhang structure, a suspended cantilever, a hollow volcano-like fiber, wall-like structures, scaffold structure, and suspended grid array of interconnected lines. In addition, multiple structures can be made using one or more electron beams and two or more of these structures can be interconnected by movement of the electron beam(s). In this regard, many different types of structures can be formed in a sequential or simultaneous manner.

In an embodiment, the electron beam can be used to form a second structure (where the liquid film includes a second liquid). The second structure is formed by etching with the second liquid and the electron beam. In an embodiment the etching can be performed on a structure on the substrate (e.g., a first structure) and/or on the substrate itself. In this manner, the interaction of the electron beam and the second fluid etches the second structure as opposed to depositing the structure.

In an embodiment, the deposition and etching processes can be used in one or more sequences to form complex structure and when multiple electron beams are used, the processes can be used simultaneously. In an embodiment, a first structure can be deposited and then etched in one or more ways to form a second structure. This can be achieved by forming a first liquid film of the first liquid, and forming the first structure. Next, the first liquid film is evaporated away and a second liquid film of the second liquid can be disposed on the substrate. Then the electron beam can be moved accordingly to interact with the first structure and/or substrate to form the second structure.

In an embodiment, the deposition (or the etching) can be used to build a composite structure made of multiple types of materials. In an embodiment, this can be achieved by forming a first liquid film of the first liquid, and forming the first structure. Then the first liquid film is evaporated away and a third liquid film of the third liquid (capable of forming a different structural material) can be disposed on the substrate to cover and/or be adjacent the first structure. Then the electron beam is directed to the appropriate area to form the composite structure.

In an embodiment, the deposition (or the etching) can be used to form a structure or structures (e.g., scaffold) adjacent or around a material (e.g., a biological material such as a cell or tissue). In this way the structure(s) can be formed deposition and/or etching around, on, and/or within the biological material. Selection of the fluid(s) can be based on favorable interaction with the biological material and having a precursor that results in deposition of material compatible with the biological material with favorable interactions (e.g., promoting cell growth or biological material incorporation into a deposited matrix). In an embodiment, the structure(s) (e.g., the first structure, forming the second structure, or a combination of thereof) form a scaffold, where the biological material and the scaffold are integral to one another. As used herein, the term "integral" refers to the biological material and the scaffold intermingled, for examples, cells can be positioned within the interior and/or exterior of the scaffold or the scaffold can from a superstructure to support a tissue.

As a result, the use of multiple processing steps of deposition and etching can be used to achieve "net shape control" of the structures.

In an embodiment, the liquid can be an aqueous solvent, an organic solvent, an electrochemically active compound, and a combination thereof. In an embodiment, the liquid can include dissolved salts, bases, acids, particles (e.g., nanoparticles such as magnetic materials (e.g., iron, cobalt), plasmonic structures (e.g., silver, gold), or silica, alumina, titania nanoparticles, or biological materials and biopolymers (e.g., cells, proteins, hydrogel capsules) and the like. In an embodiment, the liquid includes a carbon structure precursor material such as glycol (e.g., ethylene glycol) and alcohol (e.g., C1 to C6 alkyl alcohols such as methanol). In an embodiment, the liquid includes a metal structure (or metal alloy structure) precursor such as a metal salt (e.g., silver nitrate or copper nitrade) or chloroplatinic acid or ionic liquids. In an embodiment, the solvent can include water, methanol, ethanol, chloroform, acetonitrile, ionic liquids, ethylene glycol, an acid (e.g., chloroplatinic acid, sulfuric acid), or a combination thereof. In an embodiment, the concentration of the precursor material in the liquid can be adjusted as needed to achieve the desired growth (deposition) or material removal (etch) rate.

The selection of the fluid can be used to determine the material content of the structure to be formed. For example, a precursor having an appropriate carbon content can be used to form a carbon structure. In an embodiment, a metal salt can be used as a precursor to form a metal or metal alloy structure. To form a composite material, different precursors (one precursor can be a silver metal salt and a second precursor can be a carbon precursor material) can be used in the same step (when liquid contains both precursors) or different steps (when liquid contains one precursor at the time) to form the composite structure of various composition and morphological structure.

The dimensions of the structure can depend upon the diameter of the electron beam and the time frame of the interaction with the electron beam. In addition, one or more electron beams can be adjacent one another to from a larger structure. In another embodiment, the structure can be etched to reduce or alter one or more of the dimensions. In this way, the dimensions of the structure can vary depending on the process. In general, the structure can have a diameter of about 5 nm to 5 µm and a height of about 1 nm to 50 µm. However, the process can be designed to form a structure that has larger or smaller dimensions as well as very complex structure with variable dimensions so that a multitude of shapes or designs can be envisioned. For example, the structure can have one of the following shapes: a pillar, a bridge structure, an overhang structure, a suspended cantilever, a hollow volcano-like fiber, wall-like structures, suspended grid array of interconnected lines, a scaffold, and combinations of these.

Now referring to a particular embodiment where a metal structure is formed, in this example, the electron beam conditions for the deposit are 25 keV and 13.4 nA at a working distance of 26.5 mm and is achieved by holding the beam in place for a duration of 300 seconds. The solvent used is ethylene glycol (which include the metal salt, silver nitrate) due to its low vapor pressure, allowing operation in high vacuum (about 0.1 mTorr). Silver structures are formed. In an embodiment, amorphous carbon deposits can be formed having a growth rate of about 0.1 µm³/s to 20 um³/s. Additional details are provided in the Example.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

Example 1

Direct-write additive nanoscale fabrication enables creation of 3D nanostructures through atom-by-atom material placement[1,2], bringing the flexibility and utility of 3D printing (e.g., biological tissue[3], robotic components[4]) to bear on nanotechnology applications. In serial writing of nanostructures using charged particles (both electrons and ions) products of irradiation induced decomposition can be deposited with high resolution[5]. Electron beam based processing avoids substrate sputtering damage and ion implantation inherent in ion beam processes[5], and has been investigated with solid, gas, and liquid phase precursors. Nanofabrication with solid phase precursors has been demonstrated via electron beam lithography with a negative resist, and 3-D structures with sub 100 nm feature sizes have been fabricated, but to date this technique has been demonstrated only with hydrogen silsesquioxane[6].

Focused electron beam induced deposition (FEBID) using gas or condensed phase precursors is a direct-write nanomanufacturing technique that is attractive due to the wide range of deposited materials including many metals,[7,8] and because of the ability to deposit without masks or additional pre/post processing. FEBID has been used for selective functionalization[9] and additive patterning[10] with resolution down to an individual atom[11]. FEBID and its complimentary approach of electron beam induced etching (FEBIE) provide a unique multifunctional nanofabrication platform for emerging carbon nanoelectronic device applications, including heterogeneous contact enhancement, patterning and selective doping of graphene and other atomically thin 2D materials[5].

FEBID has a demonstrated utility for direct writing of complex 3D nanostructures with overhangs, suspended structures, and voids. The combination of capabilities demonstrated for FEBID make it extraordinary as a nanofabrication method, and yet its use is currently limited, primarily because the most common and easily achieved approaches for FEBID suffer from low throughput and/or a limited ability to achieve complex structures, while high throughput approaches capable of creating interesting topologies require highly specialized equipment and multi-step processing sequences.

The precursor for FEBID is most commonly delivered to the vacuum environment in the gas phase (GP-FEBID). GP-FEBID typically uses organic or organometallic precursors, for carbon or metal deposition, respectively. In the latter case, large amounts of carbon are co-deposited with the metals[12]. Although GP-FEBID enjoys the benefit of significant flexibility of applicability in terms of deposit material, substrate material, and substrate topology, the low precursor density in GP-FEBID limits deposition rates and thus throughput[12].

In FEBID with condensed phase precursor, high precursor density results in high deposition rates. For liquid phase precursors, challenges exist in combining liquid phase introduction with high vacuum electron beam deposition environments. This challenge was initially overcome using a sealed capsule to maintain liquid near atmospheric pressure with electron beam access via a thin membrane made of, for instance, polyimide, to minimize beam attenuation.[13] Using such capsules, deposition of high purity gold[14], palladium[15] silver[16,17], silicon[18,19] platinum,[13,20] and binary alloys[21] from aqueous salts has been demonstrated. Depositing through the membrane of a capsule has several features that limit practical utility of this approach. First, the deposits grow on the inside of the membrane, restricting the composition of the substrate to material that is thin and electron beam-transparent, and thus cannot be applied to thick Si/SiO₂ substrates common in electronic applications. Second, the electron beam scatters as it travels through the membrane and loses energy, limiting the achievable deposit spatial resolution and heating the membrane. Membrane damage[17] occurs if too much energy is lost to the membrane, limiting the allowed beam current and exposure time, which can, in turn, restrict achievable deposit growth rate and maximum size. These limitations not only diminish usefulness of this method for nanoscale manufacturing, but also place constraints on the capability to fabricate topologically complex nanostructures, and the flexibility to study a broad range of beam conditions, which is essential for uncovering the fundamentals of the deposition mechanism.

Reliance on membranes and capsules for liquid phase FEBID was eliminated through the introduction of innovative methods for precursor directly into the vacuum environment of an electron microscope.[22] These approaches make possible the use of condensed phase FEBID for formation of nanostructures from an open (i.e., membraneless) film of either (1) metallic salts dissolved in water on a cooled substrate in an environmental SEM (ESEM) with moderate pressure (~100 Pa) water vapor (LP-FEBID),[23] or (2) organometallic precursors injected as gas and condensed on a cryogenically cooled substrate (Cryo-FEBID).[24] With direct access to the condensed film, the electron beam has sufficient energy to travel through the film, depositing material on the substrate with growth counter to the beam direction, thus expanding the choice of suitable substrate materials and eliminating the heating limitations of a thin polyimide membrane. These approaches bring condensed phase FEBID closer being a reliable and flexible direct write nanofabrication technique with acceptable throughput and novel capabilities for forming topologically complex structures spanning a broad range of scales from nano to micro demanded by practical device applications.

Cryo-FEBID has produced structures containing platinum, tungsten and tin from organometallic precursors developed for GP-FEBID (and thus most likely with similar carbon/metal composition in the deposits) but with deposition rates 4 orders of magnitude greater than observed in GP-FEBID.[24] Cryo-FEBID has been used to nano-fabricate 3-D structures with ~20 nm resolution. While Cryo-FEBID demonstrates a significant advance in deposition rate and the ability to deposit 3-D nanostructures with a variety of materials, drawbacks include the need for complex cryogenic equipment, a requirement for substrates compatible with cryogenic temperatures, and the potential for damaging thermo-mechanical stresses associated with a significant difference in temperature experienced by nanostructures during fabrication and operation.

Using LP-FEBID, deposition of copper and silver have been demonstrated from salt-water solutions.[23] Like Cryo-FEBID, LP-FEBID deposition rates are orders of magnitude greater than those in GP-FEBID, but LP-FEBID uses different precursors, and the proposed mechanism of deposition, electrochemical reduction of metallic cations by secondary or solvated electrons, is different than the mechanism of bond cleavage by secondary electrons that occurs in both Cryo- and GP-FEBID. Deposit uniformity, adhesion to substrate and repeatability are poor in LP-FEBID, largely due to difficulty creating and maintaining the liquid pool at the desired thickness. If FEBID with condensed phase precursors could be accomplished at or close to room temperature, with good control of precursor film thickness then FEBID could become a widely used nanofabrication approach.

In this work, we demonstrate a versatile method for LP-FEBID based on nanoelectrospray injection of a low vapor pressure precursor, growing carbon and silver nanostructures at rates up to five orders of magnitude greater than standard GP-FEBID. First, the novel liquid injection approach using electro-hydrodynamic atomization of a non-volatile alcohol is described. Then the deposition of carbon nanostructures from the alcohol is characterized. Next the ability to modulate the liquid film thickness within the SEM is demonstrated. Finally, we show that the approach can be extended to the deposition of silver nanostructures, and compare those structures to carbon deposits to obtain insight into the deposit mechanisms.

In nanoelectrospray, electrohydrodynamic injection of liquid produces a charged liquid jet that breaks into a spray of very small (~200 nm) droplets[25]. While electrospraying a low vapor pressure alcohol (ethylene glycol), the injection flow rate can be modulated and the liquid film thickness can be controlled. When the liquid contains no metal cations, carbon nanostructures are grown via a fundamentally different mechanism than in typical LP-FEBID approaches: solid carbon formation occurs at the liquid/high-vacuum interface due to direct solvent decomposition. This results in a reversal of the growth direction, with deposition starting at the liquid film surface, rather than at the solid substrate. With the addition of a silver containing salt, silver nanostructures are grown as in traditional LP-FEBID with aqueous solutions, but nanoelectrospray enables modulation of liquid film thickness and therefore dramatically greater flexibility in deposit geometry.

Nanoelectrospray-assisted FEBID (NESA-FEBID) grows nanoscale deposits in controlled thickness liquid films injected onto a solid substrate in a high vacuum ($10^{-4}$ torr) scanning electron microscope chamber (FIG. 1). Liquid film thickness is determined by the balance of the rate of liquid injection, which leads to film growth, and the combined effects of evaporation and liquid decomposition upon interaction with electron beam, which reduce film thickness. Liquid injection occurs via nanoelectrospray from a pulled glass tip. Using a low-vapor pressure precursor, ethylene glycol (with water and sodium dodecyl sulfate added to improve wetting and electrospray performance), we avoid the need to modify the environment through either encapsulation or operation in a low-vacuum gas vapor environment, such as water in environmental SEM (ESEM). Because the beam neither has to neither penetrate an environmental capsule, nor be transmitted through the higher pressures in an environmental SEM chamber, scattering is minimized, allowing higher electron beam densities and preserving beam focus.

Figures 6A, 6B:
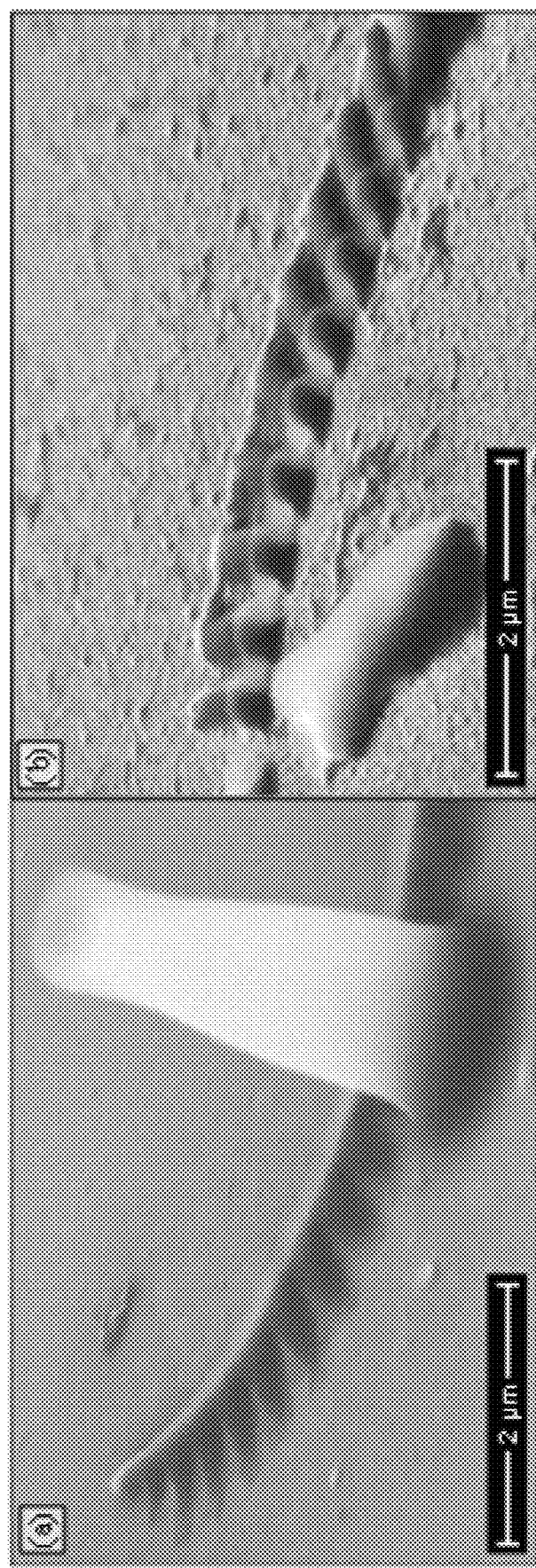
FIGS. 6A-B show the incomplete bridge formed on free surface of the film, comprised of interconnected individual nanopillars that did not fuse to the substrate. The deposit precipitates on the substrate upon liquid film removal. Both bridges were deposited at 20 keV and total pillar/bridge dosages of 1 nC/0.5 nC and 500 nm spacing between exposure sites on the bridge segment. Beam currents were 1 nA in FIG. 6A and 250 pA in FIG. 6B, resulting in total exposure times for pillars/bridges of 1 s/0.5 s and 4 s/2 s, respectively.
Figures 7A, 7B:
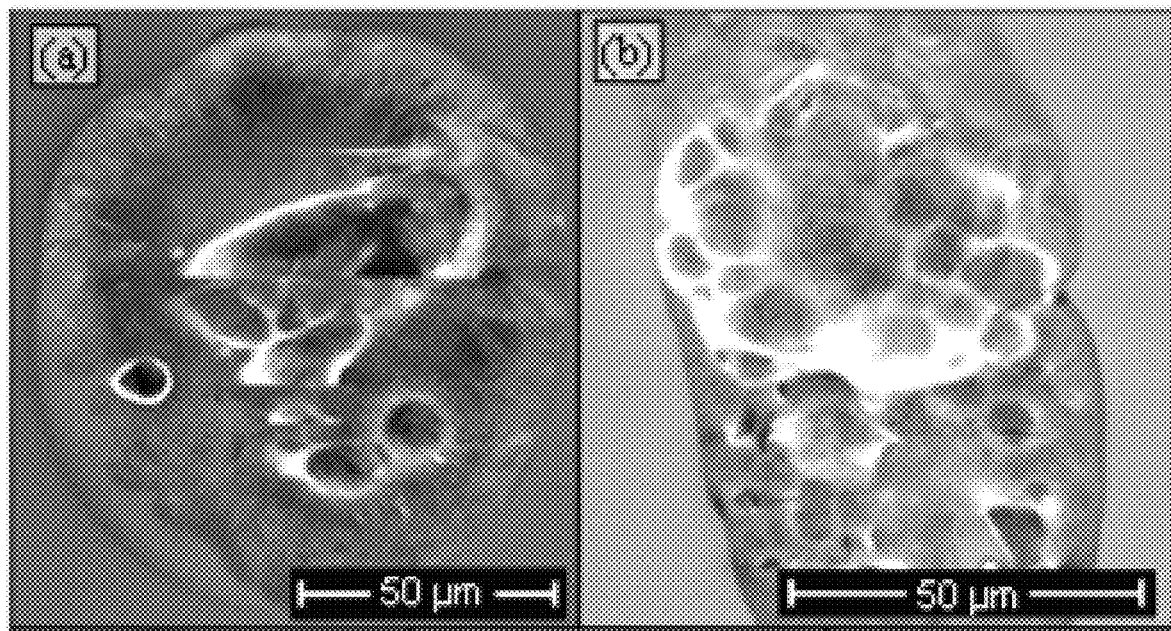
FIGS. 7A-E demonstrate high beam current effects with images of bubbling of liquid film during imaging, after nanostructure patterning beam exposure.
Figures 7C, 7D, 7E:
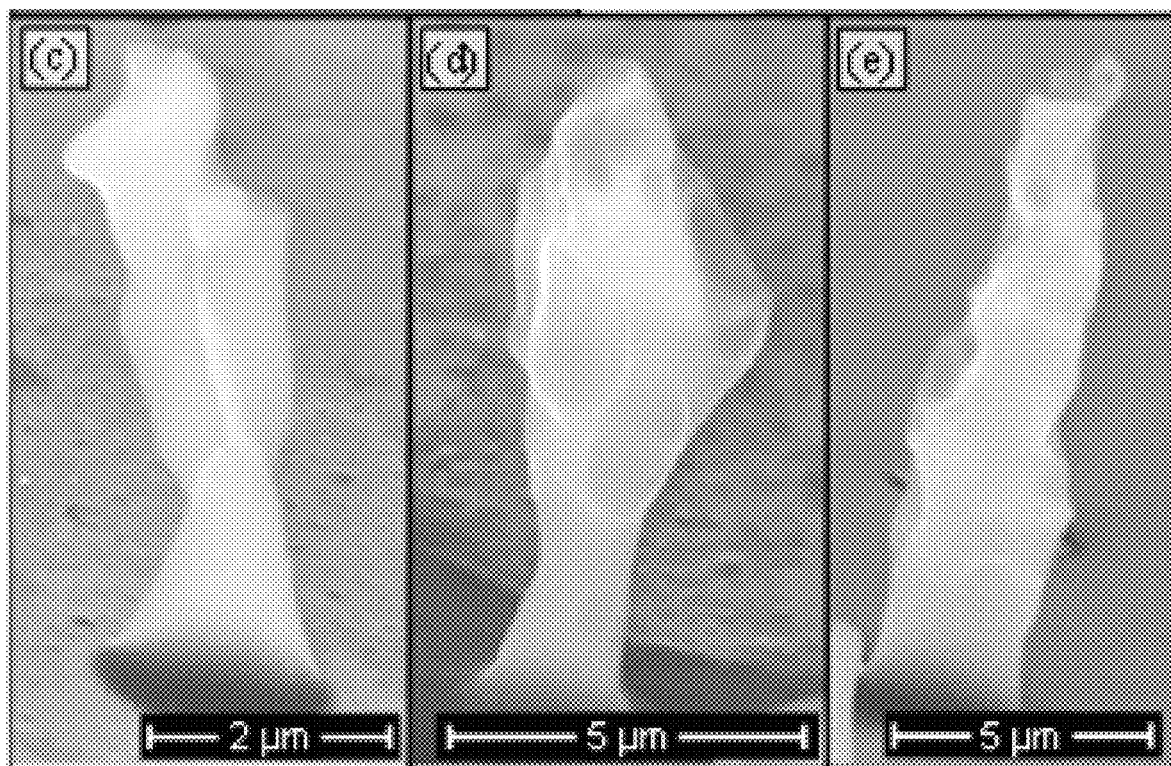
Figures 8A, 8B, 8C, 8D:
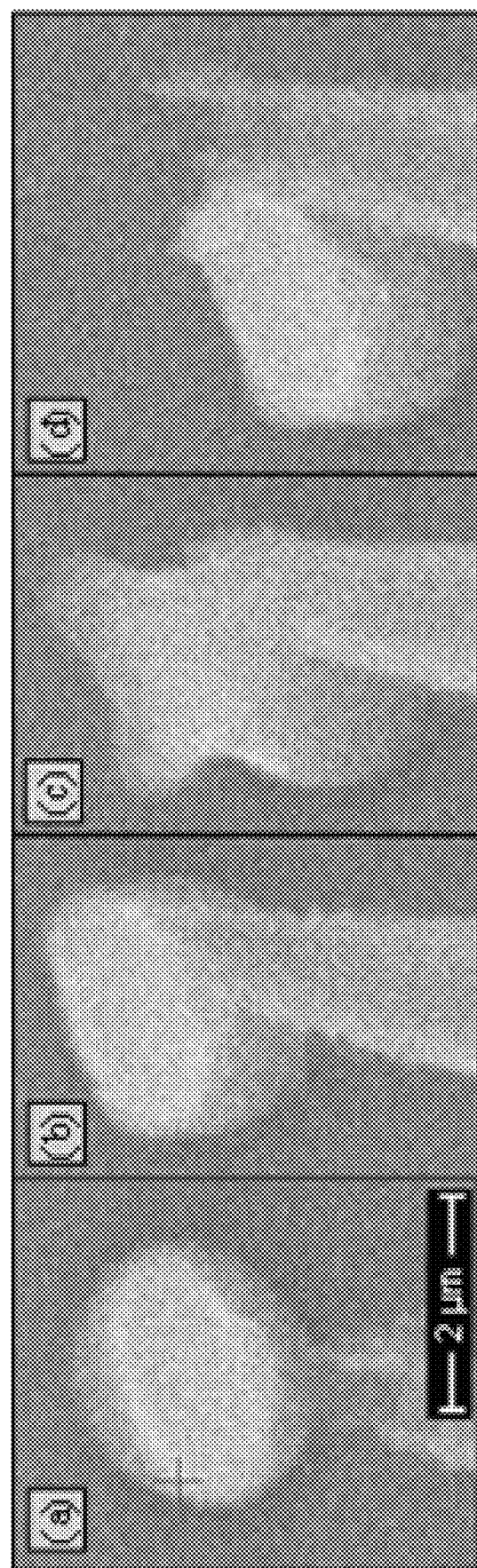
FIGS. 8A-D show results of a mechanical impact test performed on a nanopillar to qualitatively determine material flexibility and adhesion to substrate. Material impact is performed by 'nudging' the nanopillar with a sharp fused silica capillary that was pulled to a ~1 um diameter. The impact process is shown sequentially in frames (FIGS. 8A-D). The pillar undergoes bending in FIGS. 8A-C until the impacting capillary slips in FIG. 8D, returning the pillar to a partially-bent state as in FIG. 8B. The nanopillar is not dislodged from the substrate as a result of the test.

Nanostructures with sharp feature definition and smooth walls are grown from the liquid/vacuum interface in the direction of beam propagation, with some lateral spreading (likely due to scattering of the primary beam and secondary electron generation, both in the liquid layer and within the deposit itself). FIGS. 2A-B show typical examples of carbon nanostructures produced via NESA-FEBID. FIG. 2A is a SEM micrograph of a pillar deposited within a thin precursor liquid film at a growth rate ~0.5 um$^3$/s. Wall-like structures, e.g., FIG. 2B, can be grown via scanning the electron beam along a line pattern. Because growth initiates at the liquid/vacuum interface and deposit growth into the liquid layer is determined by delivered electron dose, structures with overhangs and cavities are readily formed, such as the bridge-like structure in FIG. 2C, which is created by first growing two vertical pillars, and then scanning the beam along a line as in wall deposition, but more rapidly so that the deposit growth is confined to the liquid layer adjacent to the film/vacuum interface. Deposit growth into the liquid film can be controlled by varying electron beam energy and dose, impingement direction, and film thickness. For example, rather than attaching to the substrate, a deposit can be grown such that it fuses with a nearby, previously made deposit via lateral spreading as demonstrated in FIG. 2D. Similarly, deposits shown in FIGS. 6A-B are formed by a series of very short beam exposures, resulting in hanging nanoposts anchored to a solid carbon thread formed on the free surface of the liquid film.

Inspection of deposits often reveals small concave features at the point of deposit initiation, e.g., FIGS. 2A, and 2D. These features are likely related to some combination of (i) the scattering of electrons upon impact with the liquid/vacuum interface, (ii) the solid phase nucleation process, and (iii) partial decomposition of deposited solid by the high-energy primary electron beam. The electron beam delivers high-energy 'primary' electrons which can be tightly focused for achieving high spatial resolution. Primary electron scattering and inelastic collisions upon impingement on the liquid film cause beam broadening, deceleration and energy loss, along with producing lower-energy 'secondary' electrons. The inferred direction of deposit growth (from the liquid/vacuum interface in the direction of electron propagation) and the composition of the deposits (discussed later) both indicate that the formation of 3D carbon nanostructures in NESA-FEBID of ethylene glycol is via electron beam decomposition of the liquid film. Decomposition of gaseous ethylene glycol by electron impact is known to occur due to low-energy secondary electrons (30-70 eV)[26], so it is possible that the mechanism of formation for the carbon structures depends on low-energy electrons. The formation of carbon deposits may be due to reactions involving the solvent, which is partially decomposed by interactions with higher-energy primary electrons to produce carbon ligand radicals, which proceed to be reduced by solvated electrons at energies favorable for reaction. It is unclear what role high-energy electrons play in the decomposition of liquid ethylene glycol, although we have found that higher-energy beams more readily produce deposits that strongly adhere to the substrate.

The observed deposition rate, calculated by dividing the deposit volume by the beam application time, is up to 10 um$^3$/s, which is 4-5 orders of magnitude faster than gas-phase FEBID growth rates on unheated substrates.[27] The high growth rate in NESA-FEBID is a substantial advantage over GP-FEBID, and allows one to overcome throughput limitations of beam-based nanofabrication techniques. Presumably, the fast deposition in LP-FEBID is a result of the high precursor density. Due to generally much higher transport rates in liquid phase, precursor supply would likely never be a factor limiting growth rate, even at high beam currents as it is often the case in GP-FEBID. Instead, the limit on deposition rate is set by the maximum beam current and resulting local liquid heating that causes bubbling and film rupture[28] with detrimental impact on control of deposit shape (see FIGS. 7A-E). Because the growth direction is opposite to that observed previously in LP-FEBID[13,23], with deposits starting at the free liquid surface and proceeding towards the liquid-substrate interface, it is important to assess the strength of the nanostructure adhesion to the substrate upon contact with substrate and termination of growth. Impact tests on deposited carbon nanopillars were performed using a microcontroller-guided cantilever in situ inside the deposition chamber and indicate high degree of bendability and strong adherence to the $SiO_2$/Si substrate (see FIGS. 8A-D).

Figures 3A, 3B:
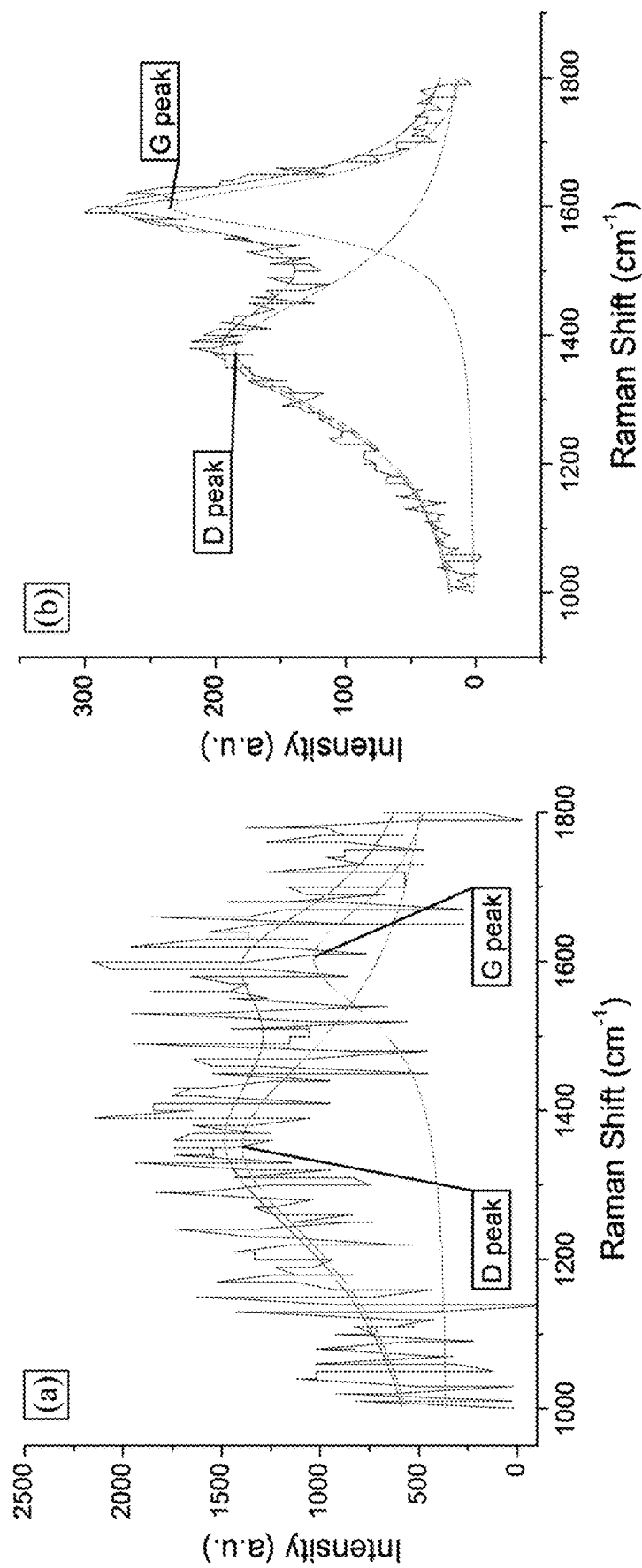
FIGS. 3A-B are Raman carbon phase analyses of NESA-FEBID nanopillars before and after air annealing due to exposure to 532 nm laser at 720 uW.
Figure 9B:
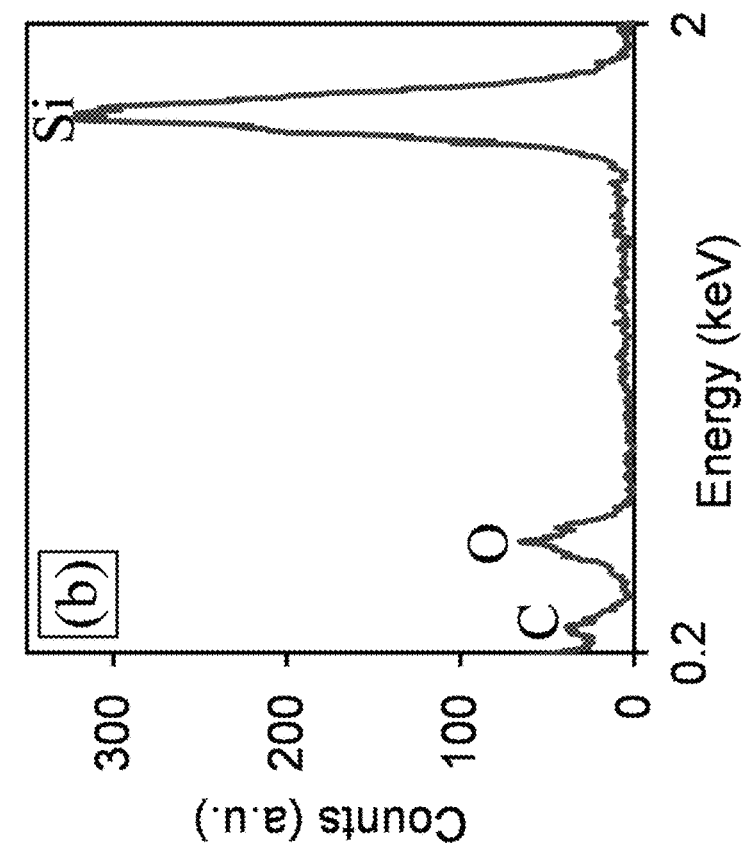
FIGS. 9A-B provide EDX composition analysis at 20 keV of NESA-FEBID nanopillars before and after annealing in air by exposure to 532 nm laser at 720 uW.
Figure 9A:
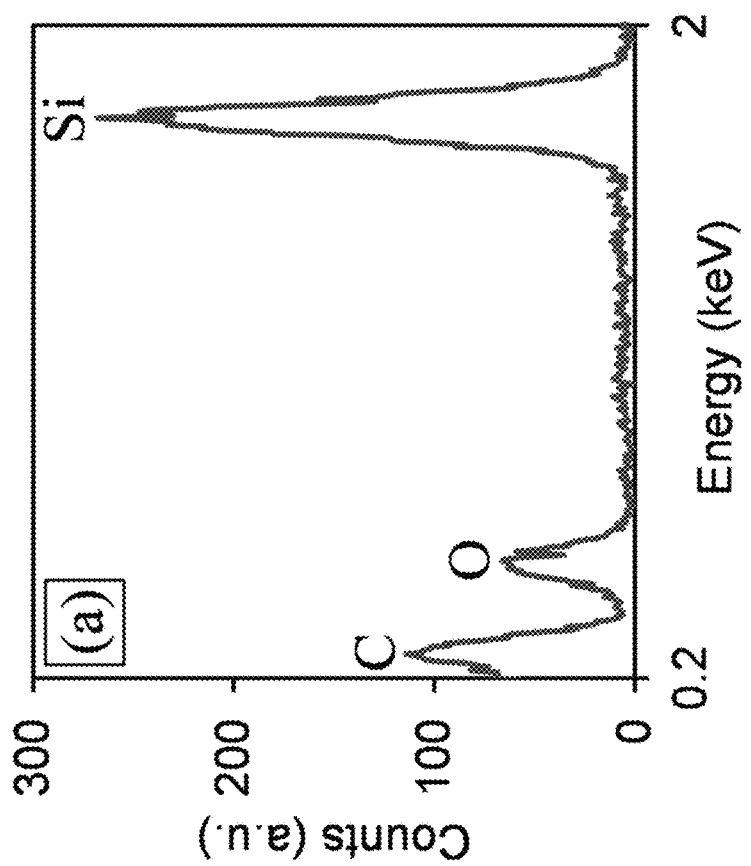

EDX elemental analysis suggests that as-deposited NESA-FEBID nanostructures are made of carbon with entrapped OH ligands, which are by-products of ethylene glycol decomposition similar to FEBID of carbon from gas phase precursors (FIGS. 9A-B). Raman analysis in FIG. 3A shows significant background fluorescence and barely recognizable, broad G and D spectral peaks, indicative of the amorphous nature of carbon structure with high content of disordered $sp^3$-type bonds and rare $sp^2$ graphitic domains. After a prolonged exposure to Raman laser irradiation, clear G and D peaks emerge at spectral positions of 1599±1.0 $cm^{-1}$ and 1377±3.0 $cm^{-1}$, respectively, as shown in FIG. 3B. An area ratio of the D to the G peaks (2.1±0.1) along with the spectral positions of G and D peaks indicates that the initially amorphous carbon nanostructures become transformed to nanocrystalline graphite upon laser annealing.[29]

Control of the liquid film thickness is of critical importance to the deposition process, since the film thickness dictates the maximum height of deposited material and film spatial uniformity is essential for making large area arrays of identical nanostructures. A promising feature of nanoelectrospray delivery of liquid precursors is flexible control of injection flow rate by changing the applied voltage. The thickness of liquid films produced via nanoelectrospray is in the micrometer and sub-micrometer range, as measured using the 2D nanoscale "ruler" shown in FIG. 4A. The "ruler" is an array of Pt/C nano-pillars of heights ranging from 260 nm to 2400 nm (fabricated using gas-phase FEBID of an organometallic precursor). These structures allow quantitative assessment of the thickness of precursor liquid films produced by nanoelectrospray inside the SEM chamber. After spray is initiated and the desired pool extent is achieved on top of the Pt/C nanopillar array (FIG. 4B), the spray voltage is gradually reduced to decrease a precursor supply and the pool thins (FIGS. 4C-4E). Due to the presence of surfactant in the liquid phase, a shallow contact angle can be achieved between the substrate and pool without significant contact line motion, as demonstrated in FIG. 4F.

Preliminary experiments demonstrating the deposition of silver using NESA-FEBID with a silver salt resulted in the formation of microstructures. Deposition with the addition of silver nitrate ($AgNO_3$) to an ethylene glycol/water/SDS solution results in a micropillar (FIGS. 5A-D) with a granular and porous structure deposited at a growth rate up to 20 $um^3$/s. EDX analysis indicates a high silver content with impurities from C, O, and N not detected at significant levels (FIG. 5D)). Inspection of the top of the micropillar (FIG. 5B) reveals a shallow, concave structure that parallels the top of the nanopillar in FIG. 2A, suggesting that the impact point of the electron beam at the liquid/vacuum interface may experience different conditions (e.g. significantly higher concentration of primary electrons) from the rest of the liquid domain and develop a different structure. Differences in the silver deposit from the carbon nanostructures suggest it may form via a fundamentally different mechanism.

We suggest that the mechanism behind the deposition of high-purity silver is electrochemical reduction of the solvated silver cations from the silver nitrate salt by reaction with low-energy (~800 meV standard reduction potential) solvated electrons generated within the ethylene glycol solvent. The solvated electron model is an accepted description of electron behavior and deposit growth by EBID in an aqueous environment[15,20,21,30,31], and we hypothesize that this behavior extends to non-aqueous environments. The granular structure of the silver micropillar is consistent with the granularity of deposits observed previously in the deposition of metals from dissolved precursors[7,13,20,23,31], suggesting that the growth mechanism is electrochemical reduction by reaction of dissolved silver ions with solvated electrons (in contrast, the amorphous carbon nanostructures are very smooth). For electrochemical reduction of dissolved ions, electron energies only need to be appropriate for the reduction reaction—any region with solvated electrons will experience deposit growth. This will result in a granular structure if the deposition rate is enhanced by the presence of the deposited metal providing a surface for reaction[15] and effectively acting as small growing electrodes at or near the electrochemical reduction potential of the dissolved ions.

In conclusion, NESA-FEBID is a new method for growing topologically complex nanoscale structures at unusually high growth rates in an additive direct-write manner. Material growth is achieved by delivering a beam of high-energy electrons to the free surface of thin liquid films established using nanoelectrospray under high vacuum conditions for improved resolution. In concert with fine control over the precursor liquid film thickness and lateral uniformity, the beam-guided top-down growth allows for the creation of topologically-complex suspended 3D structures, such as bridges, cavities, and overhangs. Our ongoing work focuses on the nanoelectrospray of dissolved salts in different solvents containing no carbon ligands for direct-write deposition of pure and alloy metal nanostructures, an early example of which was demonstrated with the fabrication of a silver micropillar. This technique, having been demonstrated for making carbon and metal nanostructures, has potential for broad applicability to direct-write 3D nanofabrication from a variety of materials using liquid precursors responsive to electron-beam-mediated deposition chemistry.

Methods

The deposition experiments were performed using a scanning electron microscope (FEI Quanta 200) operated at beam energy 10 keV to 30 keV, with currents ranging from 100 pA to 1 nA. Nanoelectrospray was achieved using a glass capillary pulled to a 2-µm tapered tip, fabricated by New Objective. The carbon precursor liquid was a solution of 99% ethylene glycol, 1% water and 4 mM sodium dodecyl sulfate (SDS)[23]. The solution composition used in the fabrication of silver micropillars was a 99.9% ethylene glycol, 0.1% water solvent containing 400 µM SDS and 25 mM $AgNO_3$. After filling with the liquid sample, the wide end of the capillary is sealed and electrical contact is established with the liquid using a sealable wire. The capillary is mounted to the SEM stage and the tip is aligned above the substrate. After vacuum is established (~$10^{-4}$ torr), the tip is positioned <100 µm from the substrate. The substrates are 1-cm square silicon wafer coupons with a thermally grown $SiO_2$ layer—the wafer segments are sputter-coated with a 30 nm-thick gold/palladium layer to provide a counter-electrode for electrospray. The substrate is electrically connected to a common ground via a picoammeter for in situ spray current measurements. Voltage control of electrospray is performed by positively biasing the liquid in a range of 300-500V to initiate electrospray. Once a liquid pool is established, the capillary tip to substrate spacing is reduced until a stable thin film is observed. Spray currents used to maintain the films are typically 250-500 pA or 1 nA for carbon or silver, respectively. Deposition is performed using patterns applied through beam-shifting and blanking control software.

After deposition, the remaining liquid is washed away, leaving behind clean nanopillars. The samples are sequentially soaked in DI water for 30 minutes and isopropyl alcohol for 5 minutes followed by vacuum drying. EDX at 20 keV electron beam energy (Hitachi S3400N SEM with Oxford Instruments detector) was used to determine the atomic composition of deposits. Raman measurements were carried out using a WITec (Alpha 300R) confocal Raman microscope with a 532 nm laser at 680-720 uW power. Several spot measurements with an integration time of 1 s were averaged yielding the Raman spectra shown in FIGS. 3A-B. The Raman data were analyzed for the spectral range between 1000 cm$^{-1}$ and 1800 cm$^{-1}$ to observe the G and D peaks of typical carbon spectra, with background fluorescence subtraction used in analysis. Lorentzian peak fitting was applied to the Raman data in order to zoom in and define D and G peak positions, intensities, and area ratios to assess the phase (amorphous vs. graphitic) of carbon before and after laser annealing. Impact tests were conducted to determine if deposits are mechanically flexible and adhered to the substrate, using a fused silica capillary pulled to a ~1 µm tip and a nanopositioning stage to move and apply a lateral force to the carbon nanopillar.

REFERENCES

1. Piner, R. D.; Zhu, J.; Xu, F.; Hong, S.; Mirkin, C. A. *Science* 1999, 283, (5402), 661-663.
2. Kim, H.-Y.; Lee, M.; Park, K. J.; Kim, S.; Mahadevan, L. *Nano Lett.* 2010, 10, (6), 2138-2140.
3. Murphy, S. V.; Atala, A. *Nat. Biotechnol.* 2014, 32, (8), 773-785.
4. Bartlett, N. W.; Tolley, M. T.; Overvelde, J. T. B.; Weaver, J. C.; Mosadegh, B.; Bertoldi, K.; Whitesides, G. M.; Wood, R. J. *Science* 2015, 349, (6244), 161-165.
5. Fedorov, A.; Kim, S.; Henry, M.; Kulkarni, D.; Tsukruk, V. *Appl. Phys. A* 2014, 117, (4), 1659-1674.
6. Yasushi, M.; Jun, T.; Iwao, M. *Jpn. J. Appl. Phys.* 2006, 45, (6S), 5538.
7. Randolph, S. J.; Fowlkes, J. D.; Rack, P. D. *Crit. Rev. Solid State Mat. Sci.* 2006, 31, (3), 55-89.
8. Utke, I.; Goelzhaeuser, A. *Angew. Chem.-Int. Edit.* 2010, 49, (49), 9328-9330.
9. Slingenbergh, W.; de Boer, S. K.; Cordes, T.; Browne, W. R.; Feringa, B. L.; Hoogenboom, J. P.; De Hosson, J. T. M.; van Dorp, W. F. *ACS Nano* 2012, 6, (10), 9214-9220.
10. Kim, S.; Henry, M. R.; Naik, R.; Voevodin, A. A.; Jang, S.; Tsukruk, V. V.; Fedorov, A. G. *Nanoscale* 2015, 7, (36), 14946-14952.
11. van Dorp, W. F.; Zhang, X.; Feringa, B. L.; Hansen, T. W.; Wagner, J. B.; De Hosson, J. T. M. *ACS Nano* 2012, 6, (11), 10076-10081.
12. Utke, I.; Hoffmann, P.; Melngailis, J. *J. Vac. Sci. Technol. B* 2008, 26, (4), 1197-1276.
13. Donev, E. U.; Hastings, J. T. *Nanotechnology* 2009, 20, (50).
14. Schardein, G.; Donev, E. U.; Hastings, J. T. *Nanotechnology* 2011, 22, (1).
15. Sutter, E. A.; Sutter, P. W. *J. Am. Chem. Soc.* 2014, 136, (48), 16865-16870.
16. Park, J. J.; Joshi-Imre, A.; Ocola, L. E.; Divan, R. *MRS Online Proceedings Library* 2012, 1371, 13-18.
17. Ocola, L. E.; Joshi-Imre, A.; Kessel, C.; Chen, B.; Park, J.; Gosztola, D.; Divan, R. *J. Vac. Sci. Technol. B* 2012, 30, (6), 06FF08.
18. Grogan, J. M.; Schneider, N. M.; Ross, F. M.; Bau, H. H. *Nano Lett.* 2014, 14, (1), 359-364.
19. Liu, Y.; Chen, X.; Noh, K. W.; Dillon, S. J. *Nanotechnology* 2012, 23, (38).
20. Donev, E. U.; Schardein, G.; Wright, J. C.; Hastings, J. T. *Nanoscale* 2011, 3, (7), 2709-2717.
21. Bresin, M.; Chamberlain, A.; Donev, E. U.; Samantaray, C. B.; Schardien, G. S.; Hastings, J. T. *Angew. Chem.-Int. Edit.* 2013, 52, (31), 8004-8007.
22. Randolph, S. J.; Botman, A.; Toth, M. *Rsc Adv.* 2013, 3, (43), 20016-20023.
23. Bresin, M.; Botman, A.; Randolph, S. J.; Straw, M.; Hastings, J. T. *Microsc. Microanal.* 2014, 20, (02), 376-384.
24. Bresin, M.; Toth, M.; Dunn, K. A. *Nanotechnology* 2013, 24, (3), 035301.
25. Wilm, M. S.; Mann, M. *Int. J. Mass Spectrom. Ion Processes* 1994, 136, (2-3), 167-180.
26. Myikyita, M. Y., Romanova, L. G.; Zavyilopulo, A. M.; Shpenik, O. B. *Ukr. J. Phys.* 2011, 56, (2), 116-121.
27. White, W. B.; Rykaczewski, K.; Fedorov, A. G. *Phys. Rev. Lett.* 2006, 97, (8), 086101.
28. Rykaczewski, K.; Scott, J. H. J.; Fedorov, A. G. *Appl. Phys. Lett.* 2011, 98, (9), 093106.
29. Kulkarni, D. D.; Rykaczewski, K.; Singamanenei, S.; Kim, S.; Fedorov, A. G.; Tsukrik, V. V. *ACS Appl. Mater. Inter.* 2011, 3, (3), 710-720.
30. Jungjohann, K. L.; Bliznakov, S.; Sutter, P. W.; Stach, E. A.; Sutter, E. A. *Nano Lett.* 2013, 13, (6), 2964-2970.
31. Schneider, N. M.; Norton, M. M.; Mendel, B. J.; Grogan, J. M.; Ross, F. M.; Bau, H. H. *J. Am. Chem. Soc. C* 2014, 118, (38), 22373-22382.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure.

All such modifications and variations are intended to be included herein within the scope of this disclosure.

What is claimed is:

1. A method, comprising:
    forming a liquid film by electrospray using an electrospray system on a substrate in a vacuum;
    directing an electron beam into a first area of the liquid film, wherein the electron beam is transmitted to the liquid film in the vacuum; and one or both of:
    forming a first structure, wherein the liquid film includes a first liquid, wherein the first structure is formed in the first area from the interaction of the electron beam with the first liquid, and
    forming a second structure, wherein the liquid film includes a second liquid, wherein the second structure is formed by etching with the second liquid and the electron beam, wherein the when second liquid contains an acid.

2. The method of claim 1, wherein the electrospray system includes two or more electrospray capillary tips, wherein each electrospray capillary tip independently directs one of the first liquid or the second liquid onto the substrate, wherein the liquid from each electrospray capillary tip is the same or different.

3. The method of claim 1, including: forming the first structure and further comprising: etching the first structure through the interaction of the electron beam and a third liquid, wherein the third liquid contains an acid.

4. The method of claim 3, further comprising: forming a third structure, wherein the third structure is formed in a second area from the interaction of the electron beam with the first liquid, wherein the first area and the second area are not the same.

5. The method of claim 1, including: forming the first structure, and forming the second structure.

6. The method of claim 1, wherein etching includes forming the second structure from the substrate.

7. The method of claim 1, wherein forming the first structure includes a growth rate of about 0.1 $\mu m^3/s$ to about 10 $\mu m^3/s$.

8. The method of claim 7, wherein the vacuum is a pressure of $10^{-6}$ to 30 Torr.

9. The method of claim 8, wherein the liquid film has a thickness of about 10 nm to 1 $\mu$m and has a width is about 10 $\mu$m to 10 mm.

10. The method of claim 9, further comprising controlling the thickness of the liquid film.

11. The method of claim 10, wherein controlling the thickness of the liquid film includes one selected from the group consisting of: controlling the spreading of the liquid, controlling the evaporation of the liquid, controlling the rate of liquid delivery, and a combination thereof.

12. The method of claim 10, wherein controlling the thickness of the liquid film includes one selected from the group consisting of: adjusting an electrospray bias of the electrospray capillary tip used to form the liquid film, adjusting a distance between the electrospray capillary tip from the liquid film, and a combination thereof.

13. The method of claim 1, wherein forming the liquid film is performed using liquid delivery using an electrospray capillary tip that is about 1 mm to 10 mm away from the substrate.

14. The method of claim 1, wherein the liquid is selected from the group consisting of: an aqueous solvent, an organic solvent, an electrochemically active compound, and a combination thereof.

15. The method of claim 1, wherein the first structure is a carbon structure, a metal structure, a metal alloy structure, a metal-carbon structure, a metal-polymer structure, and a carbon-biological material structure.

16. The method of claim 1, wherein the first structure has a diameter of about 5 nm to 5 $\mu$m and a height of about 1 nm to 50 $\mu$m.

17. The method of claim 1, wherein the first structure is selected from the group consisting of: a pillar, a bridge structure, an overhang structure, a suspended cantilever, a hollow volcano-like fiber, a wall-like structure, a porous 3D scaffold, a scaffold, and suspended grid array of interconnected lines.

18. The method of claim 1, wherein the electron beam has an energy of about 0.3 to 40 keV with a current of about 1 pA to 1 $\rho$A.

19. The method of claim 1, further comprising: applying an electric field of about 500 V/mm to 1500 V/mm relative to a ground electrode of the electrospray system in order to induce electrospray.

20. The method of claim 1, wherein forming the first structure, forming the second structure, or a combination of thereof includes forming the first structure, the second structure, or both adjacent to a biological material, wherein forming the first structure, forming the second structure, or a combination of thereof includes forming a scaffold, wherein the biological material and the scaffold are integral to one another.

* * * * *